(12) United States Patent
Okada et al.

(10) Patent No.: US 8,012,611 B2
(45) Date of Patent: *Sep. 6, 2011

(54) SURFACE-COATED CUTTING TOOL

(75) Inventors: Yoshio Okada, Itami (JP); Naoya Omori, Itami (JP); Minoru Itoh, Itami (JP); Norihiro Takanashi, Itami (JP); Shinya Imamura, Itami (JP); Susumu Okuno, Itami (JP)

(73) Assignee: Sumitomo Electric Hardmetal Corp., Hyogo (JP)

( * ) Notice: Subject to any disclaimer, the term of this patent is extended or adjusted under 35 U.S.C. 154(b) by 819 days.

This patent is subject to a terminal disclaimer.

(21) Appl. No.: 11/665,980

(22) PCT Filed: Oct. 24, 2005

(86) PCT No.: PCT/JP2005/019476
§ 371 (c)(1),
(2), (4) Date: Apr. 23, 2007

(87) PCT Pub. No.: WO2006/046498
PCT Pub. Date: May 4, 2006

(65) Prior Publication Data
US 2007/0292670 A1    Dec. 20, 2007

(30) Foreign Application Priority Data
Oct. 29, 2004 (JP) .................................. 2004-316338

(51) Int. Cl.
B23B 27/14    (2006.01)

(52) U.S. Cl. ............ 428/701; 51/307; 51/309; 428/216; 428/325; 428/336; 428/697; 428/698; 428/702

(58) Field of Classification Search .................. 51/307, 51/309; 428/216, 325, 336, 697, 698, 699, 428/701, 702, 704
See application file for complete search history.

(56) References Cited

U.S. PATENT DOCUMENTS

| 4,180,400 A | * | 12/1979 | Smith et al. ................... 428/469 |
| 5,250,367 A | | 10/1993 | Santhanam et al. |
| 5,266,388 A | | 11/1993 | Santhanam et al. |

(Continued)

FOREIGN PATENT DOCUMENTS

IL    124475    5/1998

(Continued)

OTHER PUBLICATIONS

English translation of JP 05-057507.*

(Continued)

*Primary Examiner* — Archene Turner
(74) *Attorney, Agent, or Firm* — McDermott Will & Emery LLP

(57) ABSTRACT

The present invention relates to a surface-coated cutting tool comprising a substrate and a coating formed on the substrate, the coating includes a first coating of TiCN and a second coating of α-type $Al_2O_3$, the first coating is located between the substrate and the aforementioned second coating, and the second coating has compressive stress S1 in an area A1 spreading from an insert ridge portion in the direction of a rake face and the direction of a flank face with distances of at least 0.5 mm respectively and has tensile stress S2 in an area A2 other than this area A1, while compressive stress S1 and tensile stress S2 are defined by the following expression (I):

$$400 \text{ MPa} \leq |S1 - S2| \leq 3500 \text{ Mpa} \qquad (I).$$

8 Claims, 2 Drawing Sheets

U.S. PATENT DOCUMENTS

| | | | |
|---|---|---|---|
| 5,861,210 A * | 1/1999 | Lenander et al. | 428/702 |
| 5,945,207 A * | 8/1999 | Kutscher et al. | 428/701 |
| 6,062,776 A | 5/2000 | Sandman et al. | |
| 6,090,476 A * | 7/2000 | Thysell et al. | 428/698 |
| 6,200,671 B1 * | 3/2001 | Lindskog et al. | 428/336 |
| 6,293,739 B1 * | 9/2001 | Uchino et al. | 407/119 |
| 6,884,496 B2 * | 4/2005 | Westphal et al. | 428/216 |
| 7,153,562 B2 * | 12/2006 | Rodmar et al. | 428/216 |
| 7,306,636 B2 * | 12/2007 | Ljungberg | 51/307 |
| 7,655,293 B2 * | 2/2010 | Ljungberg | 51/307 |
| 7,691,496 B2 * | 4/2010 | Park et al. | 428/698 |
| 7,754,316 B2 * | 7/2010 | Littecke et al. | 428/216 |
| 2002/0187370 A1 * | 12/2002 | Yamagata et al. | 428/698 |
| 2004/0180241 A1 | 9/2004 | Rodmar et al. | |
| 2008/0292905 A1 * | 11/2008 | Okada et al. | 428/702 |
| 2009/0297835 A1 * | 12/2009 | Okada et al. | 428/336 |

FOREIGN PATENT DOCUMENTS

| | | | |
|---|---|---|---|
| IL | 130351 | | 6/1999 |
| JP | 54-010314 | | 1/1979 |
| JP | 05-057507 | * | 3/1993 |
| JP | 5-177411 | | 7/1993 |
| JP | 5-177412 | | 7/1993 |
| JP | 5-177413 | | 7/1993 |
| JP | 6-55311 | | 3/1994 |
| JP | 06-055311 | * | 3/1994 |
| JP | 6-79502 | | 3/1994 |
| JP | 08-052603 | | 2/1996 |
| JP | 10-015707 A | | 1/1998 |
| JP | 3087465 | | 7/2000 |
| JP | 2000-515433 | | 11/2000 |
| JP | 2001-506929 | | 5/2001 |
| JP | 2002-543993 | | 12/2002 |
| JP | 2003-094230 | | 4/2003 |
| JP | 2004-223711 | | 8/2004 |
| WO | WO 9205009 | | 4/1992 |
| WO | WO 97/20083 A1 | | 6/1997 |
| WO | WO 98/28464 A1 | | 7/1998 |
| WO | WO 99/52662 | | 10/1999 |
| WO | WO 02/04156 A1 | | 1/2002 |

OTHER PUBLICATIONS

Japanese Decision to Grant Patent, with English translation, issued in Japanese Patent.

Israeli Office Action, issued in Israeli Patent Application No. 182724, dated Jun. 16, 2010.

Japanese Office Action, with English translation, issued in Japanese Patent Application No. 2006-550620, mailed Apr. 19, 2011.

* cited by examiner

SURFACE-COATED CUTTING TOOL

RELATED APPLICATIONS

This application is a national phase of PCT/JP2005/019476 filed Oct. 24, 2005, which claims priority from Japanese Application No. 2004-316338 filed Oct. 29, 2004, the disclosures of which Applications are incorporated by reference herein. The benefit of the filing and priority dates of the International and Japanese Applications is respectfully requested.

TECHNICAL FIELD

The present invention relates to a cutting tool such as a drill, an end mill, an indexable insert for a drill, an indexable insert for an end mill, an indexable insert for milling, an indexable insert for turning, a metal saw, a gear cutting tool, a reamer or a tap, and more particularly, it relates to a surface-coated cutting tool formed on the surface thereof with a coating improving characteristics such as toughness and wear resistance.

BACKGROUND ART

In general, cemented carbide (a WC-Co alloy or an alloy prepared by adding a carbonitride such as Ti (titanium), Ta (tantalum) or Nb (niobium) thereto) has been employed as a tool for cutting. Following the recent speed-up of cutting, however, the ratio of usage of a hard alloy tool comprising a substrate of cemented carbide, cermet, a cubic boron nitride sintered body or alumina-based or silicon nitride-based ceramics whose surface is coated with at least one coating layer of a compound formed by at least one first element selected from the group IVa elements, the group Va elements and the group VIa elements of the element periodic table, Al (aluminum), Si and B and at least one second element selected from B, C, N and O (if the first element is only B, the second element is other than B) by CVD (Chemical Vapor Deposition) or PVD (Physical Vapor Deposition) so that the thickness of the coating layer is 3 to 20 μm is increased.

This cutting tool has a rake face coming into contact with chips of a workpiece and a flank face coming into contact with the workpiece itself in cutting, and a portion corresponding to a ridge where the rake face and the flank face intersect with each other (and a portion around the same) is referred to as an insert ridge portion.

In recent years, the cutting speed has been more increased in order to further improve cutting efficiency, and higher wear resistance has been required to the cutting tool following this. However, toughness is reduced if high wear resistance is required, and hence compatibility between high wear resistance and high toughness is required.

As an attempt for satisfying such requirement, Japanese Patent Laying-Open No. 05-177411 (Patent Document 1), for example, pays attention to residual tensile stress of a cover layer caused when the cover layer is formed on a substrate by chemical vapor deposition (CVD) at a high temperature and thereafter cooled to the room temperature, assumes that this tensile stress brings reduction of toughness of a cutting tool, and proposes a solution thereto. In other words, this tensile stress results from the difference between the thermal expansion coefficients of the substrate and the cover layer, and a technique of improving toughness (fracture resistance) while maintaining high wear resistance by first forming a first cover layer having such tensile stress on the substrate, forming prescribed cracks on this first cover layer and thereafter forming a second cover layer having compressive stress on the first cover layer is employed.

Japanese Patent Laying-Open No. 05-177412 (Patent Document 2), paying attention to tensile stress of a cover layer similarly to the above, employs an approach different from the above and proposes a structure prepared by forming an inner cover layer having tensile stress on a hard ceramics substrate and forming an outer cover layer having compressive stress thereon. Further, Japanese Patent Laying-Open No. 05-177413 (Patent Document 3) proposes a cutting tool, comprising a substrate of cermet, having a structure similar to that of Patent Document 2.

On the other hand, Japanese Patent Laying-Open No. 06-055311 (Patent Document 4) proposes a cutting tool prepared by forming a hard cover layer on a substrate of cemented carbide by chemical vapor deposition while substantially eliminating tensile stress from the hard cover layer on a rake face portion while holding tensile stress of the hard cover layer on a flank face portion.

Japanese Patent No. 3087465 (Japanese Patent Laying-Open No. 06-079502, Patent Document 5) proposes a cutting tool prepared by forming a hard cover layer having compressive stress distribution substantially uniform over the entire insert on the surface of a titanium carbonitride-based cermet substrate and increasing compressive stress of a rake face portion beyond compressive stress of a flank face portion by at least 49 MPa by performing shot blasting on the hard cover layer.

However, while compatibility between toughness and wear resistance can be attained to a certain extent in each of the aforementioned proposals, higher performance is required to a cutting tool under the present circumstances of the cutting tool, and development of a cutting tool sufficiently satisfying such performance is demanded.

Patent Document 1: Japanese Patent Laying-Open No. 05-177411

Patent Document 2: Japanese Patent Laying-Open No. 05-177412

Patent Document 3: Japanese Patent Laying-Open No. 05-177413

Patent Document 4: Japanese Patent Laying-Open No. 06-055311

Patent Document 5: Japanese Patent No. 3087465 (Japanese Patent Laying-Open No. 06-079502)

DISCLOSURE OF THE INVENTION

Problems to be Solved by the Invention

The present invention has been proposed in consideration of the aforementioned situation, and an object thereof is to provide a surface-coated cutting tool highly reconciling toughness and wear resistance with each other.

Means for Solving the Problems

The inventor has made deep study in order to solve the aforementioned problems, to recognize that it is most effective for reconciling toughness and wear resistance with each other to select a specific material for a coating covering a substrate and pay attention to not adjustment of stress in units of layers in a case of covering the substrate with a plurality of layers or adjustment of stress in units of surfaces such as a rake face and a flank face but a specific portion of the coating for adjusting stress of this portion to that different from the stress of another portion, and further made study on the basis of this recognition to finally complete the present invention.

The present invention relates to a surface-coated cutting tool comprising a substrate and a coating formed on this substrate, the coating includes a first coating of TiCN and a second coating of α-type $Al_2O_3$, the first coating is located between the aforementioned substrate and the aforementioned second coating, and the second coating has compressive stress S1 in an area A1 spreading from an insert ridge portion in the direction of a rake face and the direction of a flank face with distances of at least 0.5 mm respectively and has tensile stress S2 in an area A2 other than this area A1, while compressive stress S1 and tensile stress S2 are defined by the following expression (I):

$$400 \text{ MPa} \leq |S1-S2| \leq 3500 \text{ MPa} \quad (I)$$

The aforementioned first coating may have tensile stress, or may be released from tensile stress to have substantially no stress.

The aforementioned first coating may have tensile stress SS1 in area A1 spreading from the insert ridge portion in the direction of the rake face and the direction of the flank face with the distances of at least 0.5 mm respectively and may have tensile stress SS2 in area A2 other than this area A1, while tensile stress SS1 and tensile stress SS2 may be defined by the following expression (II):

$$0 \leq |SS1-SS21 \leq 500 \text{ MPa} \quad (II)$$

The aforementioned first coating may have a columnar structure whose aspect ratio is at least 3, and may have a structure whose average particle diameter is at least 0.05 μm and not more than 1.5 μm. Further, the aforementioned first coating may have a thickness of 2 to 20 μm, and the aforementioned second coating may have a thickness of 0.5 to 20 μm.

The aforementioned first coating may further contain oxygen, and may also contain at least one element selected from the group consisting of the group IVa elements, the group Va elements and the group VIa elements of the element periodic table, Si, Y, B and S. Further, the aforementioned second coating may further contain at least one element selected from the group consisting of the group IVa elements, the group Va elements and the group VIa elements of the element periodic table, Si, Y, B and S.

Effects of the Invention

The surface-coated cutting tool according to the present invention highly reconciles toughness and wear resistance with each other due to the aforementioned structure.

Figure 1:
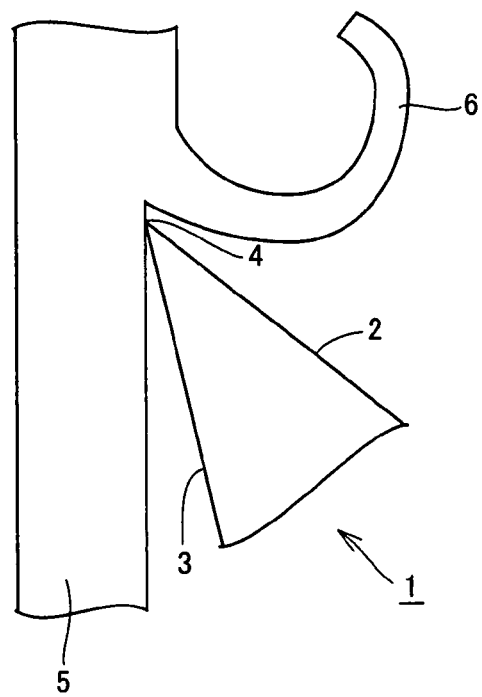
FIG. 1 is a schematic diagram typically showing a contact state between a surface-coated cutting tool and a workpiece in cutting.

DESCRIPTION OF THE REFERENCE SIGNS 1 surface-coated cutting tool, 2 rake face, 3 flank face, 4 insert ridge portion, 5 workpiece, 6 chip, 7 through-hole, 8 substrate, 9 coating, 10 first coating, 11 second coating.

BEST MODES FOR CARRYING OUT THE INVENTION

The present invention is now described in more detail. While the following embodiment is described with reference to the drawings, identical reference numerals denote the same or corresponding portions in the drawings of this application.

<Surface-Coated Cutting Tool>

The surface-coated cutting tool according to the present invention has a structure comprising a substrate and a coating formed on this substrate.

This surface-coated cutting tool 1 has a rake face 2 coming into contact with a chip 6 of a workpiece 5 and a flank face 3 coming into contact with the workpiece itself in cutting as shown in FIG. 1, and a portion corresponding to a ridge where this rake face 2 and flank face 3 intersect with each other is referred to as an insert ridge portion 4 and serves as a central point of action for cutting workpiece 5. According to study of the inventor, it has been proved that an area A1 spreading from this insert ridge portion 4 in the direction of the rake face and the direction of the flank face with distances of at least 0.5 mm respectively serves as a portion substantially participating in cutting with respect to the workpiece, as shown in FIGS. 2 to 5.

Figure 3:
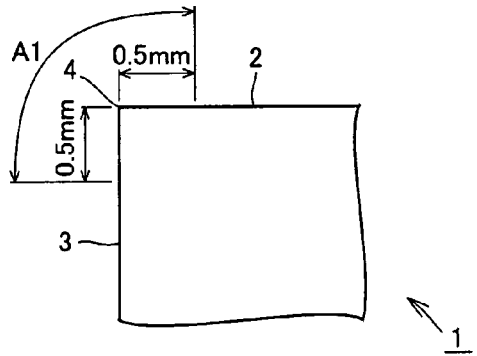
FIG. 3 is an enlarged schematic sectional view of an insert ridge portion (sharp edge).
Figure 4:
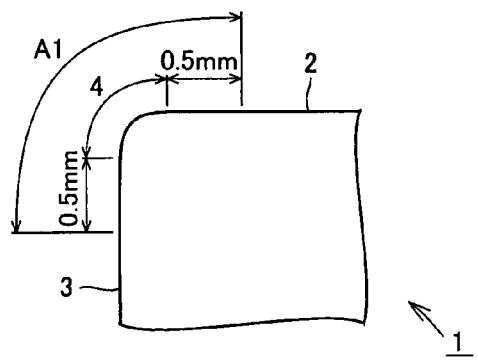
FIG. 4 is an enlarged schematic sectional view of an edged insert ridge portion.
Figure 5:
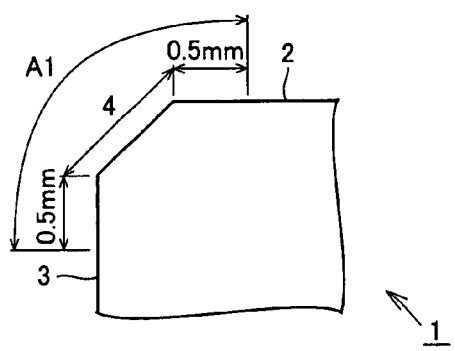
FIG. 5 is an enlarged schematic sectional view of a chamfered insert ridge portion.

It is assumed that insert ridge portion 4 according to the present invention includes not only the portion (sharp edge) corresponding to the ridge where rake face 2 and flank face 3 intersect with each other as shown in FIG. 3 but also a portion (so-called round-type horning) obtained by edging the sharp edge to have a radius (R) as shown in FIG. 4 and a chamfered portion (so-called chamfer-type horning) as shown in FIG. 5, and further includes a portion treated in combination of such edging and chamfering.

It is further assumed that area A1 spreading from this insert ridge portion 4 in the direction of rake face 2 and the direction of flank face 3 with the distances of at least 0.5 mm respectively is an area spreading with a prescribed width in both directions of rake face 2 and flank face 3 with reference insert ridge portion 4 as obvious from FIGS. 2 to 5, and the width of this spreading is at least 0.5 mm from an end of insert ridge portion 4 (the sharp edge in the case of the sharp edge as shown in FIG. 3).

While this area A1 must have the width of at least 0.5 mm from insert ridge portion 4 as described above, this is because area A1 is the area participating in cutting with respect to the workpiece as hereinabove described. Considering that this area A1 is the area substantially participating in cutting to the utmost, therefore, it follows that the maximum value of the width of this area A1 fluctuates depending on the depth of cut in cutting (the depth of cut depends on a chip breaker). In other words, it may be necessary to set the maximum value of the width in the rake face direction to about 10 mm since the width coming into contact with the chip (range where a vertical force acts) is also increased when deeply cutting the workpiece. However, the width is sufficiently not more than 5 mm in general, more preferably not more than 4 mm, and further preferably not more than 3 mm. On the other hand, the width in the flank face direction not coming into contact with the chip is hardly influenced by the depth of cut, and the maximum value is sufficiently not more than 3 mm in general. Therefore, the width of area A1 is particularly preferably set to at least 0.5 mm and not more than 3 mm.

Thus, if the width of area A1 is smaller than that of the portion participating in cutting, the whole of the portion participating in cutting cannot be included and hence no effect of attaining compatibility between toughness and wear resistance by adjusting stress in this area A1 is exhibited. If the width of area A1 exceeds the aforementioned maximum value, a portion not substantially participating in cutting must also be treated and hence a high cost is required for the treatment, leading to an economic disadvantage. Therefore, the optimum value is preferably properly selected for the width of area A1 in consideration of conditions for cutting, particularly in relation to the depth of cut.

This surface-coated cutting tool can be employed as a drill, an end mill, an indexable insert for a drill, an indexable insert for an end mill, an indexable insert for milling, an indexable insert for turning, a metal saw, a gear cutting tool, a reamer or a tap, for example.

Figure 2:
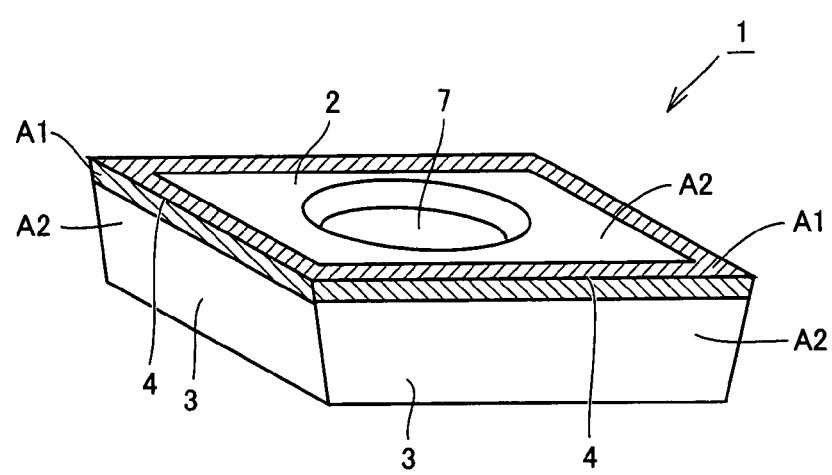
FIG. 2 is a schematic perspective view of the surface-coated cutting tool.

This surface-coated cutting tool 1 can be provided with a through-hole 7 on the central portion thereof as shown in FIG. 2 if the same is an indexable insert, for example, so that the same can be mounted on a tool body. Another fixing means can be provided in addition to or in place of this through-hole 7 if necessary.

<Substrate>

A well-known substrate known as the substrate for such a cutting tool can be used as the aforementioned substrate without particular limitation. For example, cemented carbide (including WC-based cemented carbide, WC, and that containing Co or further containing a carbonitride such as Ti, Ta or Nb, for example), cermet (mainly composed of TiC, TiN, TiCN or the like), high-speed steel, ceramics (titanium carbide, silicon carbide, silicon nitride, aluminum nitride, aluminum oxide or the like), a cubic boron nitride sintered body, a diamond sintered body, a silicon nitride sintered body or a mixture of aluminum oxide and titanium carbide can be listed as such a substrate.

Among such various substrates, cemented carbide (WC-based cemented carbide) is preferably employed particularly in the present invention. This is because cemented carbide is an extremely well-balanced alloy as a substrate for a cutting tool, having both of high hardness and high strength due to a main body of hard tungsten carbide and an iron group metal such as cobalt contained therein.

<Coating>

Figure 6:
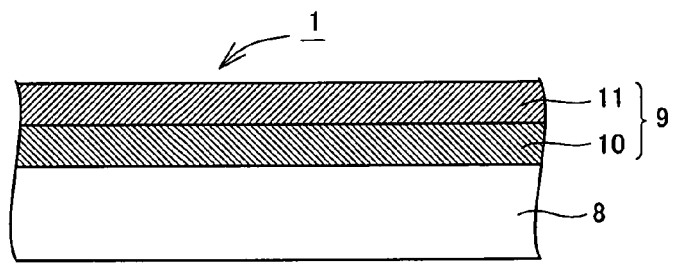
FIG. 6 is a schematic sectional view of the surface-coated cutting tool.

As shown in FIG. 6, a coating 9 formed on the aforementioned substrate 8 is mainly formed in order to further improve the toughness and further improve the wear resistance, and includes a first coating 10 of TiCN and a second coating 11 of α-type $Al_2O_3$.

This coating can include a third coating in addition to the aforementioned first coating and the aforementioned second coating, in order to further improve adhesiveness between the coating and the substrate, further improve adhesiveness between the first coating and the second coating, or improve the state of the coating surface.

For example, TiN, TiC, TiCO, TiBN, ZrCN, TiZrCN, AlN, AlON, TiAlN or the like can be listed as the third coating.

The third coating can be formed as a single layer or at least two layers, and the mode of layering thereof is not particularly restricted but the third coating may be formed on at least one arbitrary portion such as between the substrate and the first coating, between the first coating and the second coating or on the surface of the second coating, for example.

While the first coating and the second coating are now described, the second coating is first described for convenience of illustration.

<Second Coating>

The second coating according to the present invention is composed of α-type $Al_2O_3$. The substrate can be effectively prevented from oxidation and elements constituting the workpiece can be extremely effectively prevented from diffusing toward the substrate in cutting by forming the second coating constituted of this material on the outermost surface of the substrate or in the vicinity of the outermost surface.

This second coating, which can be solely constituted of α-type $Al_2O_3$, may further contain at least one element selected from the group consisting of the group IVa elements (Ti, Zr, Hf etc.), the group Va elements (V, Nb, Ta etc.) and the group Via elements (Cr, Mo, W etc.) of the element periodic table, Si, Y, B and S. The mode of the contained element is not particularly restricted but the element may be introduced into a normal position of the crystal lattice of the aforementioned α-type $Al_2O_3$ as a substitutional element, may be introduced into the crystal lattice as an interstitial element, may form an intermetallic compound, or may be present as an amorphous element, for example.

This element may be present to have any concentration distribution for homogeneously distributing in the coating, for distributing in high concentration or low concentration in grain boundaries or for distributing in high concentration or low concentration on a surface portion of the coating. This element is preferably contained in concentration of 0.01 to 30 atomic % with respect to Al of α-type $Al_2O_3$, and more preferably, the upper limit thereof is 20 atomic %, further preferably 10 atomic %, and the lower limit thereof is 0.05 atomic %, further preferably 0.1 atomic %. Effects brought by introduction of this element (such an effect that the second coating exhibits high hardness and high strength at a high temperature or is supplied with excellent lubricity, for example) may not be exhibited if the concentration is less than 0.01 atomic %, while the crystal lattice of the second coating may be so distorted that the hardness and the strength are reduced if the concentration exceeds 30 atomic %.

This second coating is preferably formed with a thickness of 0.5 to 20 μm, and more preferably, the upper limit thereof is 10 μm, further preferably 5 μm, and the lower limit thereof is 1 μm, further preferably 1.5 μm. Chemical stability of the second coating itself may be so damaged that progress of wear such as adhesion wear or diffusion wear quickens if the thickness is less than 0.5 μm, while the strength of the coating may be so damaged that spalling or chipping of the coating may occur, finally resulting in fracture if the thickness exceeds 20 μm.

This second coating has compressive stress S1 in area A1 spreading from the insert ridge portion in the direction of the rake face and the direction of the flank face with the distances of at least 0.5 mm respectively and has tensile stress S2 in area A2 other than this area A1, while compressive stress S1 and tensile stress S2 are defined by the following expression (I):

$$400 \text{ MPa} \leq |S1-S2| \leq 3500 \text{ MPa} \quad (I)$$

As described above, area A1 spreading from the insert ridge portion in the direction of the rake face and the direction of the flank face with the distances of at least 0.5 mm respectively is the portion substantially participating in cutting with respect to the workpiece, and the toughness is remarkably improved by setting compressive stress S1 as the stress of this portion. The compressive stress is a kind of internal stress (specific strain) present in the coating, which is expressed in a numerical value of "−" (minus) (unit: MPa). Therefore, the concept of large compressive stress indicates that the absolute value of the aforementioned numerical value is increased, and the concept of small compressive stress indicates that the absolute value of the aforementioned numerical value is reduced.

In this second coating, tensile stress S2 is set as the stress in area A2 other than the aforementioned area A1, thereby keeping adhesion of the coating and maintaining the wear resistance. The tensile stress is also a kind of internal stress (specific strain) present in the coating, which is expressed in a numerical value of "+" (plus) (unit: MPa). Therefore, the concept of large tensile stress indicates that the aforementioned numerical value is increased, and the concept of small tensile stress indicates that the aforementioned numerical value is reduced.

Further, the second coating according to the present invention is characterized in that the aforementioned compressive stress S1 and the aforementioned tensile stress S2 are defined by the above expression (I). Thus, compatibility between the toughness and the wear resistance is enabled at a particularly high level. The effect of improving the toughness cannot be sufficiently attained if the absolute value (|S1−S2|) of the difference between compressive stress S1 and tensile stress S2 is less than 400 MPa in the above, while such a state may be brought that the second coating spalls from an underlayer if the value exceeds 3500 MPa. More preferably, the upper limit of the absolute value (|S1−S2|) of the difference between compressive stress S1 and tensile stress S2 is 3000 MPa, further preferably 1700 MPa, and the lower limit thereof is 700 MPa, further preferably 1000 MPa.

While a method of forming the aforementioned stress distribution is not particularly restricted in the second coating according to the present invention, desired stress distribution can be formed by using the aforementioned cemented carbide as the substrate, forming a coating of α-type $Al_2O_3$ by well-known chemical vapor deposition (CVD) and supplying compressive stress to area A1 spreading from the insert ridge portion of this coating, generally having tensile stress, in the direction of the rake face and the direction of the flank face with the distances of at least 0.5 mm respectively by a technique such as brushing, blasting (including sandblasting or wet blasting, for example), shot peening or bombardment of PVD, for example.

On the other hand, this coating film of α-type $Al_2O_3$ can alternatively be formed by well-known physical vapor deposition (PVD) and this coating generally has compressive stress in this case, and hence a method performing treatment according to a technique such as heat treatment, laser treatment or high-frequency treatment on area A2 other than area A1 of this coating spreading from the insert ridge portion in the direction of the rake face and the direction of the flank face with the distances of at least 0.5 mm respectively thereby releasing the portion from the compressive stress and supplying tensile stress can also be employed.

This stress distribution can be measured according to a $\sin^2 \psi$ method with an X-ray stress measuring apparatus by selecting the (116) plane of α-type $Al_2O_3$ as a measured diffraction plane. The aforementioned areas A1 and A2 have prescribed sizes respectively, whereby the aforementioned compressive stress S1 and the aforementioned tensile stress S2 can be measured by measuring stress of arbitrary 10 points included in each area (these points are preferably selected at distances of at least 0.5 mm from each other so that the same can represent the stress of each area) by this method and obtaining the average value thereof.

This $\sin^2 \psi$ method employing X-rays is widely employed as a method of measuring residual stress of a polycrystalline material, and a method detailedly described in "X-Ray Stress Measurement" (The Society of Materials Science, Japan, 1981, issued by Kabushiki Kaisha Yokendo), pages 54 to 66, for example, may be employed.

In order to obtain the stress distribution from a $2\theta-\sin^2 \psi$ diagram as described above, the Young's modulus and the Poisson's ratio of the coating are necessary. However, the Young's modulus can be measured with a dynamic hardness meter or the like, while a value of about 0.2 may be employed for the Poisson's ratio not remarkably varying with the material. In the present invention, no particularly correct stress value is important but the stress difference is important. When obtaining the stress difference from the $2\theta-\sin^2 \psi$ diagram, therefore, the lattice constant and the lattice spacing may be obtained without employing the Young's modulus for substituting for the stress distribution.

Also when the second coating according to the present invention contains at least one element selected from the group consisting of the group IVa elements, the group Va elements and the group VIa elements of the element periodic table, Si, Y, B and S as hereinabove described, the (116) plane is present on a substantially equivalent position of $2\theta$, and hence the stress can be measured similarly to the above.

<First Coating>

The first coating according to the present invention is located between the aforementioned substrate and the aforementioned second coating, and composed of TiCN. The aforementioned second coating of α-type $Al_2O_3$ having the aforementioned excellent effects has such a characteristic that the same is relatively fragile, and hence higher wear resistance may be required in application at a relatively low cutting temperature in which abrasive wear resistance is regarded as particularly important. The first coating according to the present invention, evidently formed for satisfying this requirement, has extremely high hardness despite such a characteristic that the first coating itself is easily oxidizable in cutting at a high temperature, and attains an action of remarkably improving the wear resistance due to the location between the aforementioned second coating and the substrate.

This first coating, which can be solely constituted of TiCN, may further contain oxygen. The mode of the contained oxygen is not particularly restricted but oxygen may be introduced into a normal position of the crystal lattice of the aforementioned TiCN as substitutional oxygen, may be introduced into the crystal lattice as interstitial oxygen, or may be present as amorphous oxygen, for example.

The first coating may also contain at least one element selected from the group consisting of the group IVa elements, the group Va elements and the group VIa elements of the element periodic table, Si, Y, B and S, in addition to the above described case containing oxygen. This element may be contained along with oxygen or alone, without oxygen.

Thus, the first coating can be solely constituted of TiCN, or may contain the aforementioned element such as oxygen in addition to the main structure of TiCN.

This element such as oxygen may be present to have any concentration distribution for homogeneously distributing in the coating, for distributing in high concentration or low concentration in grain boundaries or for distributing in high concentration or low concentration on a surface portion of the coating. This element such as oxygen is preferably contained in concentration of 0.1 to 40 atomic % with respect to the total of C and N in TiCN, and more preferably, the upper limit thereof is 30 atomic %, further preferably 20 atomic %, and the lower limit thereof is 1 atomic %, further preferably 5 atomic %. Effects brought by the contained element such as oxygen (refinement of crystal grains, for example) may not be exhibited if the concentration is less than 0.1 atomic %, while the crystal lattice of the coating may be so distorted that the hardness or the strength is reduced if the concentration exceeds 40 atomic %.

This first coating is preferably formed with a thickness of 2 to 20 µm, and more preferably, the upper limit thereof is 15 µm, further preferably 10 µm, and the lower limit thereof is 2.5 µm, further preferably 3 µm. Wear may so progress that the substrate is thereby exposed to further remarkably prompt the progress of wear if the thickness is less than 2 µm, while the strength of the coating may be so damaged that spalling or chipping of the coating may occur, finally resulting in fracture if the thickness exceeds 20 µm.

This first coating preferably has a columnar structure whose aspect ratio is at least 3, and has a structure whose average particle diameter is at least 0.05 µm and not more than 1.5 µm. The abrasive wear resistance can be further improved due to this structure. The aspect ratio is a numerical value obtained by measuring the average particle diameter of crystals contained in the first coating by the following method and dividing the thickness of the first coating by this average particle diameter. This average particle diameter can be measured by mirror-finishing a section of the first coating and etching grain boundaries of the crystals and thereafter measuring the width of each crystal (width of each crystal in a direction perpendicular to the direction of the thickness) at a point of half the thickness of the first coating for regarding the average value of the width as the average particle diameter.

If this aspect ratio is less than 3, the abrasive wear resistance may not be improvable. While the upper limit of this aspect ratio may not be defined since the abrasive wear resistance is improved as the numerical value is increased, the crystals may be so excessively refined that the structure gets fragile to deteriorate the fracture resistance if the aspect ratio exceeds 300. The aspect ratio is more preferably 7 to 200, and further preferably, the upper limit thereof is 100, particularly preferably 50, and the lower limit thereof is 15, particularly preferably 20.

If the average particle diameter is less than 0.05 µm, the crystals may be so excessively refined that the structure gets fragile to deteriorate the fracture resistance. If the average particle diameter exceeds 1.5 µm, the structure of the crystals may be so roughened that irregularity on the surface is deteriorated to deteriorate cutting resistance in relation to flow of chips or the like. The average particle diameter is more preferably at least 0.1 µm and not more than 1.0 µm, and further preferably, the upper limit thereof is 0.6 µm, particularly preferably 0.4 µm, and the lower limit thereof is 0.15 µm, particularly preferably 0.2 µm.

This first coating preferably has tensile stress, or is preferably released from tensile stress to have substantially no stress. When the stress of the first coating film is set to such stress, high adhesiveness can be attained between the first coating and the substrate, and particularly excellent wear resistance can be implemented.

Further, this first coating preferably has tensile stress SS1 in area A1 spreading from the insert ridge portion in the direction of the rake face and the direction of the flank face with the distances of at least 0.5 mm respectively and has tensile stress SS2 in area A2 other than area A1, while tensile stress SS1 and tensile stress SS2 are preferably defined by the following expression (II):

$$0 \leq |SS1-SS2| \leq 500 \text{ MPa} \quad \text{(II)}$$

Area A1 and area A2 are the same areas as those in the case of the aforementioned second coating. The provision that the absolute value ($|SS1-SS2|$) of the difference between tensile stress SS1 and tensile stress SS2 is in the range shown by the above expression (II) indicates that influence by the treatment on area A1 (or the treatment on area A2) performed in the aforementioned second coating in order to have the aforementioned prescribed stress distribution is preferably not substantially transmitted to this first coating. In other words, the first coating may not substantially have stress distribution similar to that of the second coating. If the absolute value ($|SS1-SS2|$) of the difference between tensile stress SS1 and tensile stress SS2 exceeds 500 MPa to the contrary, adhesiveness with the underlayer may be so disadvantageously damaged that spalling or chipping of the coating may occur, finally resulting in fracture. The upper limit of the absolute value ($|SS1-SS2|$) of the difference between tensile stress SS1 and tensile stress SS2 is more preferably 200 MPa, further preferably 100 MPa.

This first coating can be formed by well-known CVD. Thus, tensile stress can be supplied to the first coating at the same time. On the other hand, this first coating can also be formed by well-known PVD, and this coating generally has compressive stress in this case. In order to convert this compressive stress to tensile stress or release the first coating from tensile stress to be in a state having substantially no stress, therefore, treatment according to a technique such as heat treatment, laser treatment or high-frequency treatment is preferably performed on the first coating.

Such stress of the first coating can be measured according to the $\sin^2 \psi$ method with the X-ray stress measuring apparatus by selecting the (422) plane of TiCN as the measured diffraction plane, similarly to the case of the aforementioned second coating. Also when the first coating according to the present invention further contains an element such as oxygen as described above, the (422) plane is present on a substantially equivalent position of 2θ and hence the stress can be measured in a similar manner.

EXAMPLES

While the present invention is now described in more detail with reference to Examples, the present invention is not restricted to these.

Examples 1 to 5 and Comparative Examples 1 to 4

Each raw material powder was wet-mixed in a ball mill for 72 hours at blending ratios of WC: 86 mass %, Co: 8.0 mass %, TiC: 2.0 mass %, NbC: 2.0 mass % and ZrC: 2.0 mass %. Then, this mixture was dried and thereafter press-molded. Thereafter sintering was performed in a vacuum atmosphere under conditions of 1420° C. and one hour.

An insert ridge portion of the obtained sintered body was chamfered by SiC brush honing, for preparing a substrate for a WC-based cemented carbide throwaway cutting tool having a tip shape of ISO•SNMG120408.

A coating of the following structure was formed on the surface of this substrate by well-known thermal CVD which is chemical vapor deposition. In other words, a surface-coated cutting tool comprising the substrate and the coating formed on this substrate was prepared by first forming a TiN film of 0.5 µm in thickness on the substrate, forming a TiCN film of 0.7 µm in thickness which is a first coating thereon, forming another TiN film of 0.5 µm in thickness thereon, forming an α-type $Al_2O_3$ film of 3.0 µm in thickness which is a second coating thereon and forming still another TiN film of 0.5 µm in thickness thereon. The coating included the first coating of TiCN and the second coating of α-type Al₂O₃ as described above, and the first coating was located between the substrate and the second coating.

Then, surface-coated cutting tools according to Examples 1 to 5 and comparative examples 1 to 4 having stress distribution (|S1−S2| value in each second coating and |SS1−SS2| value in each first coating) shown in Table 1 were prepared by performing blasting with ceramic abrasive grains of Al₂O₃ or the like having particle diameters of not more than 250 μm under conditions of a projection pressure of 0.01 to 0.5 MPa, a projection distance of 0.5 to 200 mm and powder concentration of 5 to 40 vol. % on areas A1 of the surface-coated cutting tools prepared in the aforementioned manner spreading from insert ridge portions in the directions of rake faces and the directions of flank faces with distances of 0.5 mm respectively. Each of the surface-coated cutting tools according to Examples 1 to 5 of the present invention had compressive stress S1 in the aforementioned area A1 of the second coating and had tensile stress S2 in area A2 other than the aforementioned area A1, while the first coating had tensile stress, or was released from tensile stress to have substantially no stress.

The aforementioned stress distribution (|S1−S2| value in each second coating and |SS1−SS2| value in each first coating) of each of Examples and comparative examples was formed by properly adjusting the conditions for the aforementioned blasting in the aforementioned numerical ranges, and this stress distribution (|S1−S2| value in each second coating and |SS1−SS2| value in each first coating) was measured by the aforementioned $\sin^2 \psi$ method.

The first coatings of the surface-coated cutting tools according to Examples 1 to 5 had columnar structures whose aspect ratios were 35, and had structures whose average particle diameters were 0.3 μm as a result of measurement according to the aforementioned method.

A turning-cutting test was performed on these surface-coated cutting tools under the following conditions, for measuring times up to fracture. Those having longer times up to fracture are superior in toughness and wear resistance.

<Test Conditions>
Workpiece: SCM435 slotted round bar
Cutting Speed: 230 m/min.
Feed Rate: 0.15 mm/rev.
Depth of Cut: 0.5 mm
Cutting Oil: none

TABLE 1

| | \|S1-S2\| Value of Second Coating | \|SS1-SS2\| Value of First Coating | Time up to Fracture |
|---|---|---|---|
| Example 1 | 450 MPa | 10 MPa | 15.7 min. |
| Example 2 | 1000 MPa | 50 MPa | 18.5 min. |
| Example 3 | 1500 MPa | 0 MPa | 17.9 min. |
| Example 4 | 1500 MPa | 150 MPa | 19.0 min. |
| Example 5 | 3400 MPa | 430 MPa | 20.0 min. |
| Comparative Example 1 | 0 MPa | 0 MPa | 1.2 min. |
| Comparative Example 2 | 50 MPa | 30 MPa | 2.5 min. |
| Comparative Example 3 | 350 MPa | 0 MPa | 3.2 min. |
| Comparative Example 4 | 4000 MPa | 30 MPa | 5.5 min. |

As obvious from Table 1, those (Examples 1 to 5) exhibiting the absolute values (|S1−S2|) of the difference between compressive stress S1 and tensile stress S2 in the above expression (I) of at least 400 MPa and not more than 3500 MPa as to the second coatings of the surface-coated cutting tools highly attained compatibility between the toughness and the wear resistance as compared with those (comparative examples 1 to 4) having the absolute values of the difference out of the aforementioned range.

Examples 6 to 10

Surface-coated cutting tools according to Examples 6 to 10 were obtained similarly to the aforementioned Examples 1 to 5, except that the aforementioned areas A1 were set to areas spreading from insert ridge portions in the directions of rake faces and the directions of flank faces with distances of 1.5 mm respectively (it was assumed that Examples 1 to 5 and Examples 6 to 10 corresponded to each other in order of numbers respectively, and the surface-coated cutting tools were so adjusted as to exhibit stress distribution similar to that shown in Table 1).

When a turning-cutting test was performed by employing conditions absolutely identical to the above except that the depth of cut was set to 1.3 mm, these surface-coated cutting tools according to Examples 6 to 10 exhibited results similar to those of the aforementioned Examples 1 to 5.

The embodiment and Examples disclosed this time must be considered as illustrative and not restrictive in all points. The scope of the present invention is shown not by the above description but by the scope of claim for patent, and it is intended that all modifications in the meaning and range equivalent to the scope of claim for patent are included.

The invention claimed is:

1. A surface-coated cutting tool comprising a substrate and a coating formed on said substrate, wherein
said coating includes a first coating of TiCN and a second coating of α-type Al₂O₃,
said first coating is located between said substrate and said second coating, and
said second coating has compressive stress S1 in an area A1 spreading from an insert ridge portion in the direction of a rake face and the direction of a flank face with distances of at least 0.5 mm respectively and has tensile stress S2 in an area A2 other than said area A1, while said compressive stress S1 and said tensile stress S2 are defined by the following expression (I):

$$400 \text{ MPa} \leq |S1-S2| \leq 3500 \text{ MPa} \quad (I).$$

2. The surface-coated cutting tool according to claim 1, wherein
said first coating has tensile stress, or is released from tensile stress to have substantially no stress.

3. The surface-coated cutting tool according to claim 1, wherein
said first coating has tensile stress SS1 in the area A1 spreading from the insert ridge portion in the direction of the rake face and the direction of the flank face with the distances of at least 0.5 mm respectively and has tensile stress SS2 in the area A2 other than said area A1, while said tensile stress SS1 and said tensile stress SS2 are defined by the following expression (II):

$$0 \leq |SS1-SS2| \leq 500 \text{ MPa} \quad (II).$$

4. The surface-coated cutting tool according to claim 1, wherein
said first coating has a columnar structure whose aspect ratio is at least 3, and has a structure whose average particle diameter is at least 0.05 μm and not more than 1.5 μm.

5. The surface-coated cutting tool according to claim 1, wherein said first coating has a thickness of 2 to 20 μm, and said second coating has a thickness of 0.5 to 20 μm.

6. The surface-coated cutting tool according to claim 1, wherein said first coating further contains oxygen.

7. The surface-coated cutting tool according to claim 1, wherein said first coating further contains at least one element selected from the group consisting of the group IVa elements, the group Va elements and the group VIa elements of the element periodic table, Si, Y, B and S.

8. The surface-coated cutting tool according to claim 1, wherein said second coating further contains at least one element selected from the group consisting of the group IVa elements, the group Va elements and the group VIa elements of the element periodic table, Si, Y, B and S.

* * * * *

UNITED STATES PATENT AND TRADEMARK OFFICE
CERTIFICATE OF CORRECTION

| | | |
|---|---|---|
| PATENT NO. | : 8,012,611 B2 | |
| APPLICATION NO. | : 11/665980 | |
| DATED | : September 6, 2011 | |
| INVENTOR(S) | : Yoshio Okada et al. | |

It is certified that error appears in the above-identified patent and that said Letters Patent is hereby corrected as shown below:

ON THE TITLE PAGE;

Page 2, Col. 2, Other Publications, lines 1 and 2,

In Item "(56) References Cited", please delete the literature reference "Japanese Decision to Grant Patent, with English translation, issued to Japanese Patent." and add -- Japanese Decision to Grant Patent, with English translation, issued in Japanese Patent Application No. 2006-543119, mailed on January 25, 2011 --.

Signed and Sealed this
Twelfth Day of June, 2012

David J. Kappos
*Director of the United States Patent and Trademark Office*